United States Patent [19]

Kushida et al.

[11] Patent Number: 5,626,121
[45] Date of Patent: May 6, 1997

[54] FUEL PUMP FOR HIGH-PRESSURE FUEL INJECTION SYSTEM

[75] Inventors: Takeo Kushida; Hideya Kikuchi; Etsuro Hozumi, all of Saitama Prefecture, Japan

[73] Assignee: Zexel Corporation, Japan

[21] Appl. No.: 562,997

[22] Filed: Nov. 27, 1995

[30] Foreign Application Priority Data

Dec. 2, 1994 [JP] Japan ..................... 6-323959

[51] Int. Cl.$^6$ ..................... F02M 37/04
[52] U.S. Cl. ..................... 123/514; 123/41.31; 123/456
[58] Field of Search ..................... 123/510, 456, 123/509, 506, 458, 450, 41.31, 514; 137/549

[56] References Cited

U.S. PATENT DOCUMENTS

| | | | |
|---|---|---|---|
| 2,936,780 | 5/1960 | Pratt | 137/549 |
| 3,314,406 | 4/1967 | Kemp | 123/514 |
| 4,310,142 | 1/1982 | Ludwig | 137/549 |
| 4,870,940 | 10/1989 | Filippi | 123/514 |
| 4,917,069 | 4/1990 | Kuhlen | 123/509 |
| 4,951,878 | 8/1990 | Casey | 137/549 |
| 5,044,338 | 9/1991 | Shelton | 123/456 |
| 5,109,822 | 5/1992 | Martin | 123/456 |
| 5,277,162 | 1/1994 | Smith | 123/456 |
| 5,318,001 | 6/1994 | Djordjevic | 123/506 |

*Primary Examiner*—Carl S. Miller
*Attorney, Agent, or Firm*—Ostrolenk, Faber, Gerb & Soffen, LLP

[57] ABSTRACT

A fuel pump for a high-pressure fuel injection system is constituted by integrating into a single pump unit 15 a high-pressure fuel pump 4 for supplying high-pressure fuel to injectors 8 for injecting high-pressure fuel into cylinders of an engine 16 and a solenoid valve unit 6 for controlling the fuel pressure of the high-pressure fuel pump 4, and the pump unit 15 is adapted for mounting on the engine. The configuration decreases required installation space, enables use of a common heat installation system and reduces the number of installation steps.

10 Claims, 7 Drawing Sheets

5,626,121

FUEL PUMP FOR HIGH-PRESSURE FUEL INJECTION SYSTEM

BACKGROUND OF THE INVENTION

1. Field of the Invention

This invention relates to a fuel pump for a high-pressure fuel injection system, more particularly to a fuel pump for a high-pressure fuel injection system whose high-pressure fuel pump section and pressure control valve section are integrated into a single unit.

2. Prior Art

In a conventional direct gasoline injection system or other such high-pressure fuel injection system, the high-pressure fuel pump and the pressure control valve (solenoid valve unit) are separately mounted on the engine. This creates various disadvantages, such as that a large amount of space is needed for installation, separate heat insulating systems are required for preventing vaporization of the supplied fuel by heat from the engine, and the work of arranging and attaching the piping for fuel supply cannot be conducted efficiently.

This invention was accomplished in light of the foregoing problems of the prior art and has as one of its objects to provide a fuel pump for a high-pressure fuel injection system which reduces the space required for installation of the high-pressure fuel pump and the pressure control valve.

Another object of the invention is to provide a fuel pump for a high-pressure fuel injection system enabling the high-pressure fuel pump and the pressure control valve to share the same heat insulation system.

Another object of the invention is to provide a fuel pump for a high-pressure fuel injection system which enables the work of arranging and attaching the fuel pipes of the high-pressure fuel pump and its pressure control valve to be conducted efficiently.

SUMMARY OF THE INVENTION

The present invention is directed to a fuel pump for a high-pressure fuel injection system wherein the high-pressure fuel pump for supplying high-pressure fuel to injectors or other such injection valves or to a common rail and the pressure control valve (solenoid valve unit) therefor are integrally constituted and mounted on the engine, the fuel piping between the high-pressure fuel pump and the pressure control valve is simplified, and the high-pressure fuel pump and the pressure control valve share a common system for heat-insulating them from the engine. The fuel pump for a high-pressure fuel injection system according to the invention comprises a high-pressure fuel pump for supplying high-pressure fuel to injectors for injecting high-pressure fuel into cylinders of an engine and a pressure control valve for controlling the fuel pressure of the high-pressure fuel pump, the high-pressure fuel pump and the pressure control valve being integrated to constitute a pump unit and the pump unit being adapted for mounting on the engine.

According to one aspect of the invention the high-pressure fuel pump comprises a cover, a pump housing and a flange and the pressure control valve has a unit housing constituted integrally with the cover of the high-pressure fuel pump.

According to another aspect of the invention, the pump unit is connected to the injectors by metal fuel pipes.

According to another aspect of the invention, a high-pressure control valve, serving as the pressure control valve, a solenoid valve and a filter are provided in the unit housing of the pressure control valve with the solenoid valve disposed near the side of the unit housing to which the fuel pipe is connected, thereby securing space for attachment of the filter.

Since the fuel pump for a high-pressure fuel injection system according to this invention has the high-pressure fuel pump and the pressure control valve (solenoid valve unit) constituted and mounted on the engine as an integrated unit, it is easy to handle, minimizes installation space and requires only a small number of installation steps.

Moreover, the fuel pump for a high-pressure fuel injection system can be provided with a common heat insulation system for heat-insulating them from the region of the engine or the cylinder head where the fuel pump is mounted, thereby obviating the need to provide separate heat insulation systems for the high-pressure fuel pump and the pressure control valve.

In addition, the invention enables the work of arranging and attaching the fuel pipes of the high-pressure fuel pump and the pressure control valve to be conducted efficiently, simplifies and reduces the length of the required piping, and, by reducing the number of seal points, effectively reduces the risk of fuel leakage to thereby increase reliability.

DETAILED DESCRIPTION OF THE PREFERRED EMBODIMENT

An embodiment of the fuel pump for a high-pressure fuel injection system according to the invention will be explained with reference to FIGS. 1 to 10, taking as an example a fuel pump for a high-pressure fuel injection system 1 which constitutes an application of the invention to a direct gasoline injection system.

Figure 1:
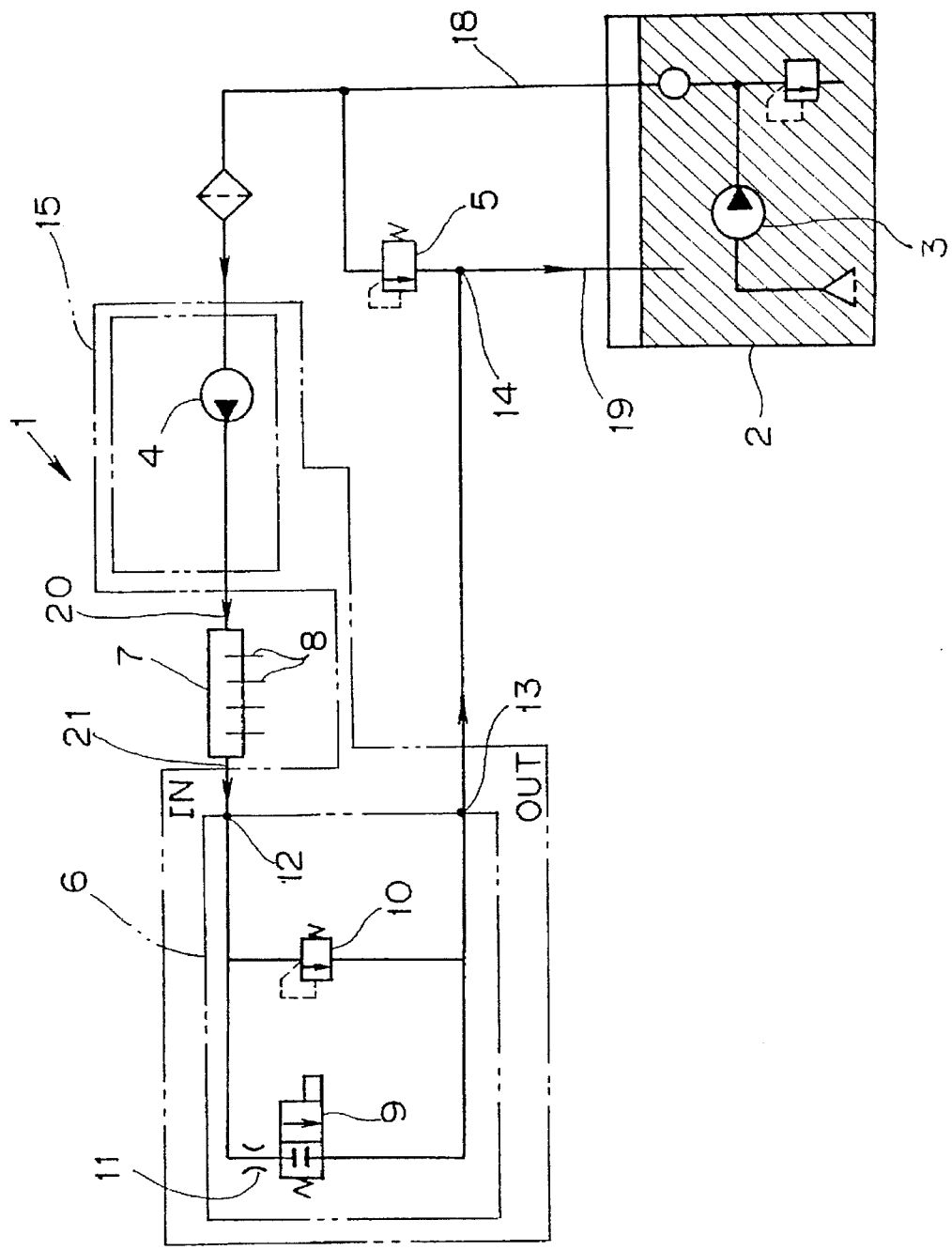
FIG. 1 is a schematic overview of a fuel pump for a high-pressure fuel injection system 1 which is an embodiment of this invention.

FIG. 1 is a schematic overview of the fuel pump for a high-pressure fuel injection system 1, which, as shown, comprises a fuel tank 2, a low-pressure feed pump (low-pressure fuel pump) 3, a high-pressure gasoline pump (high-pressure fuel pump) 4, a low-pressure control valve (low-pressure regulator) 5 for the high-pressure gasoline pump 4, and a solenoid valve unit 6. The fuel pump for a high-pressure fuel injection system 1 supplies fuel (gasoline) to injectors 8 through a common rail 7.

The solenoid valve unit 6 has a solenoid valve 9 and a high-pressure control valve (high-pressure regulator) 10, and the solenoid valve 9 is provided with an orifice 11.

In the solenoid valve unit 6, the high-pressure control valve 10 and the solenoid valve 9 are connected in parallel between a high-pressure side inlet port 12 and a low-pressure side outlet port 13. The low-pressure side outlet port 13 communicates with a return connection point 14.

In this invention, the high-pressure gasoline pump 4 and the solenoid valve unit 6 are integrated into a pump unit 15.

Figure 2:
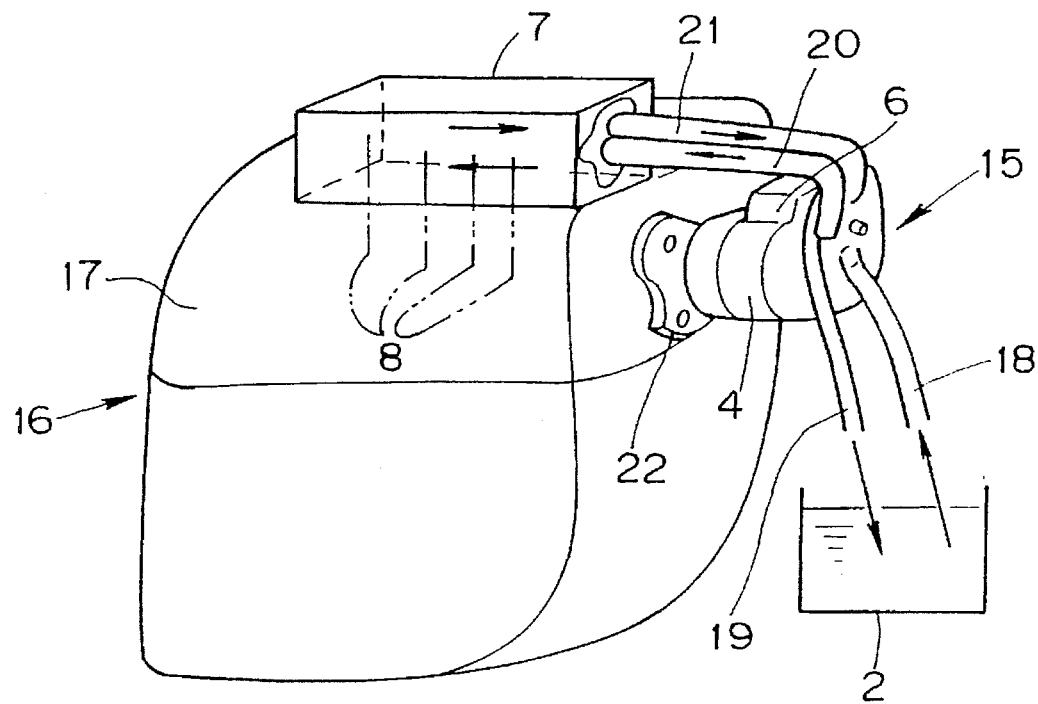
FIG. 2 is a perspective view showing the pump unit 15 of the fuel pump for a high-pressure fuel injection system 1 mounted on an engine 16 (a cylinder head 17).
Figure 3:
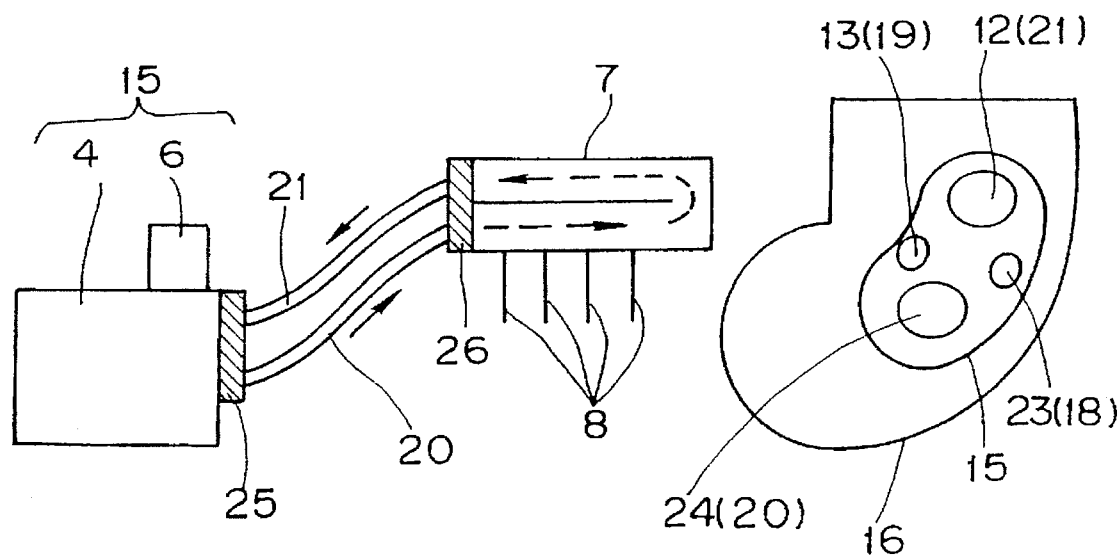
FIG. 3 is a disassembled view of the fuel pump for a high-pressure fuel injection system 1.

FIG. 2 is a perspective view showing the pump unit 15 of the fuel pump for a high-pressure fuel injection system 1 mounted on an engine 16 (a cylinder head 17) and FIG. 3 is a disassembled view of the fuel pump for a high-pressure fuel injection system 1. A fuel supply pipe 18, made of rubber, is connected between the low-pressure feed pump 3 and the pump unit 15, and a fuel return pipe 19, made of rubber, extends from the pump unit 15 into the fuel tank 2.

A high-pressure fuel supply pipe 20, made of steel or other metal material, is connected between the high-pressure gasoline pump 4 and the common rail 7, and a high-pressure fuel control pipe 21, also made of metal, is connected between the common rail 7 and the solenoid valve unit 6.

The pump unit 15, which integrates the high-pressure gasoline pump 4 and the solenoid valve unit 6, is mounted on the cylinder head 17 by means of a flange 22 of the high-pressure gasoline pump 4.

As shown best in FIG. 3, the surface of the pump unit 15 on the side thereof opposite from the flange 22 of the high-pressure gasoline pump 4 is provided with a supply pipe connector 23 for connecting the fuel supply pipe 18, the low-pressure side outlet port 13 for connecting the fuel return pipe 19, a high-pressure supply pipe connector 24 for connecting the high-pressure fuel supply pipe 20, and the high-pressure side inlet port 12 for connecting the high-pressure fuel control pipe 21. Thus the four pipe connections are clustered on this side of the pump unit 15.

While FIG. 3 shows separate flanges 25, 26 for connection of the high-pressure fuel supply pipe 20 and the high-pressure fuel control pipe 21, these can be replaced by a single flange.

Figure 4:
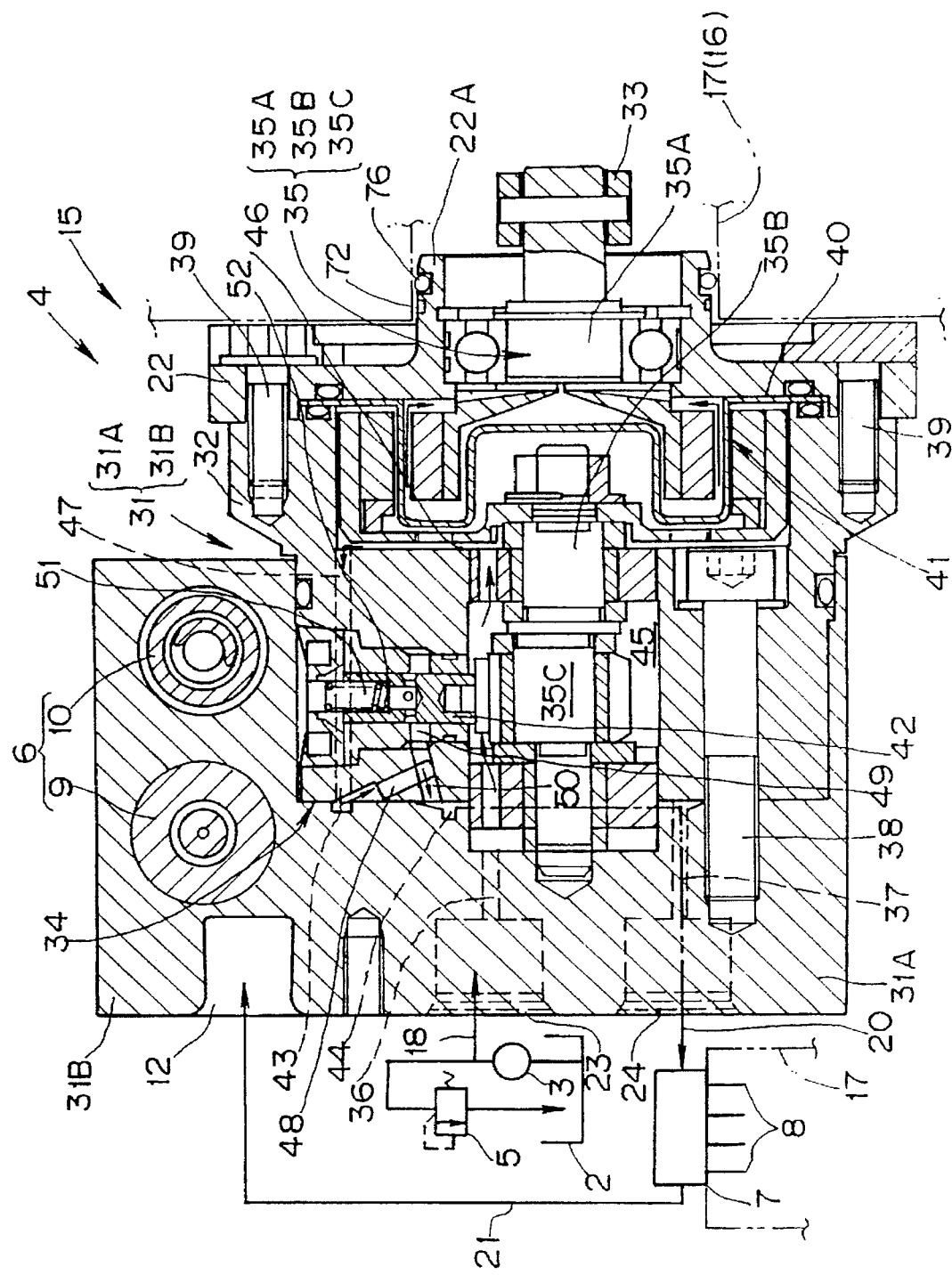
FIG. 4 is a sectional view of the pump unit 15 of the fuel pump for a high-pressure fuel injection system 1, showing a specific configuration of a high-pressure gasoline pump 4 thereof.
Figure 5:
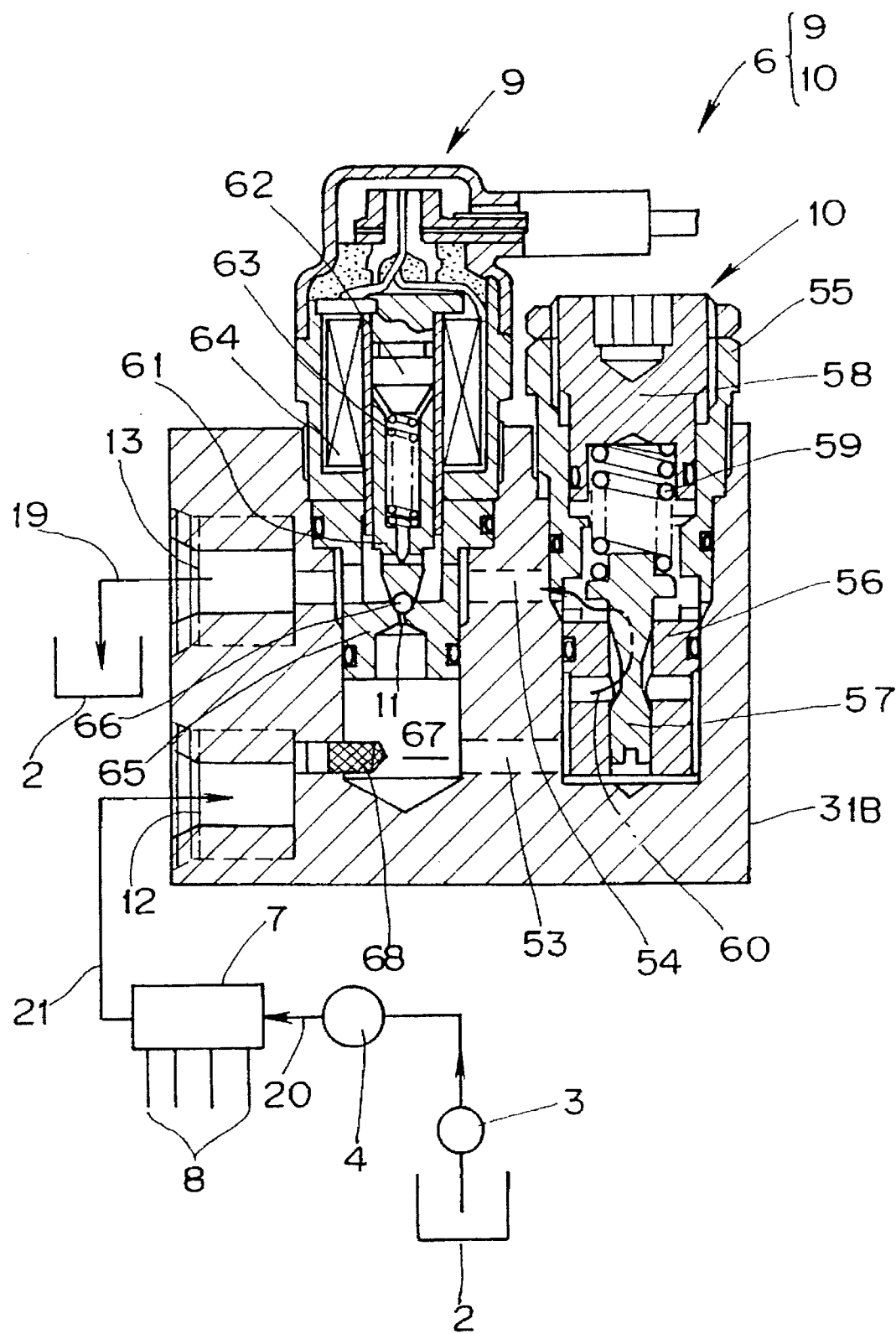
FIG. 5 is a sectional view of the pump unit 15, showing a specific configuration of a solenoid valve unit 6 thereof.

FIG. 4 is a sectional view of the pump unit 15 of the fuel pump for a high-pressure fuel injection system 1, showing a specific configuration of a high-pressure gasoline pump 4 thereof, and FIG. 5 is a sectional view of the pump unit 15, showing a specific configuration of a solenoid valve unit 6 thereof.

The pump unit 15 is the structure obtained by integrating the high-pressure gasoline pump 4 and the solenoid valve unit 6 shown in FIG. 1.

More specifically, the pump unit 15 has a control valve housing 31 constituted by integrating a cover 31A of the high-pressure gasoline pump 4 and a unit housing 31B of the solenoid valve unit 6, a pump housing 32, the flange 22, a coupling 33 for receiving power from the engine 16, a leaf valve 34 positioned between the control valve housing 31 and the pump housing 32, and a pump shaft 35 which is driven by the coupling 33.

The cover 31A of the control valve housing 31 is formed with an intake passage 36 and an discharge passage 37 and the control valve housing 31 is fastened to the pump housing member 32 by bolts 38. In addition, the pump housing 32 and the flange 22 are fastened together by housing bolts 39.

The pump shaft 35 bridges the pump housing 32 and the flange 22 and is divided into a drive-side shaft 35A and a driven-side shaft 35B which are located on opposite sides of a partition 40 made of a nonmagnetic material. The driven-side shaft 35B is formed with an eccentric cam 35C.

A magnetic coupling 41 is provided between the drive-side shaft 35A and the driven-side shaft 35B. The magnetic coupling 41 straddles the partition 40 and enables power supplied to the drive-side shaft 35A from the engine 16 to be transmitted to the driven-side shaft 35B.

Multiple (e.g. five) pistons 42 are provided in the pump housing 32 and are reciprocated in sequence by the eccentric cam 35C of the pump shaft 35.

The pistons 42 are disposed radially within a plane perpendicular to the axis of the pump shaft 35 so that rotation of the pump shaft 35 causes them to reciprocate, namely to move centripetally (downward in FIG. 4) and centrifugally (upward in FIG. 4).

The leaf valve 34 is formed with intake valves 43 and discharge valves 44 (only one of each shown). The pump housing 32 is further formed with a fuel passage starting from the intake passage 36 and passing in succession through a cam chamber 45, a coupling chamber 46, an intake-side communication passage 47 and an intake-side passage 48, and thereafter through an intake/discharge port 49, a discharge-side passage 50, a discharge valve 44 and the discharge passage 37.

Pressurization chambers 51 are formed inside the pistons 42 in communication with the intake/discharge ports 49, and the pistons 42 are urged centripetally by piston springs 52. When the pump shaft 35 is rotated, the pistons operate to intake fuel through the intake valves 43 and discharge it through the discharge valves 44.

As shown in FIG. 5, the solenoid valve unit 6 includes the solenoid valve 9 and the high-pressure control valve 10. The high-pressure side inlet port 12 of the solenoid valve unit 6 is connected with the high-pressure gasoline pump 4 through the high-pressure fuel control pipe 21 and the common rail 7, while the low-pressure side outlet port 13 thereof is connected with the fuel tank 2 through the fuel return pipe 19.

The unit housing 31B is formed with a high-pressure side passage 53 and a low-pressure side passage 54. The high-pressure control valve 10 and the solenoid valve 9 are disposed across these passages.

The high-pressure control valve 10 includes a valve housing 55, a valve seat member 56, a pressure regulation valve body 57, a valve seat housing 58 and a pressure regulation spring 59.

When the pressure from the high-pressure side inlet port 12 becomes excessively high, the pressure regulation valve body 57 is lifted off the valve seat member 56 against the force of the pressure regulation spring 59 so as to connect the high-pressure side passage 53 and the low-pressure side passage 54 through a closable passage 60 formed between the pressure regulation valve body 57 and the valve seat member 56. (The closable passage 60 is indicated by a phantom line in FIG. 5.)

The solenoid valve 9, which provided across the high-pressure side passage 53 and the low-pressure side passage 54, includes an armature 61, a spring seat member 62, a solenoid spring 63, a solenoid 64, a valve seat member 65 and a valve body 66 formed integrally with the armature 61 at the tip thereof. The valve body 66 opens and closes the orifice 11 referred to earlier.

A filter installation space 67 is further provided to communicate with the high-pressure side passage 53 and the high-pressure side inlet port 12, and a filter 68 is installed between the high-pressure side inlet port 12 and the filter installation space 67. This configuration prevents dirt entering the high-pressure side inlet port 12 through the high-pressure gasoline pump 4, high-pressure fuel supply pipe 20, common rail 7 and high-pressure fuel control pipe 21 from lodging at the seat of the high-pressure control valve 10 (between the valve seat member 56 and the pressure regulation valve body 57) or at the seat of the solenoid valve 9 (between the valve seat member 65 and the valve body 66).

The filter installation space 67 can alternatively be formed by disposing not the high-pressure control valve 10 but the solenoid valve 9 on the side of the high-pressure side inlet port 12.

At the time of starting the engine 16, the solenoid 64 of the solenoid valve 9 is turned ON to communicate the high-pressure side passage 53 and the low-pressure side passage 54, thereby enabling delivery of pressurized fuel from the low-pressure feed pump 3, not from the high-pressure gasoline pump 4, so that low-pressure fuel can be used during engine starting. Then during normal high-pressure operation following the start of misfire free operation, the solenoid 64 is turned OFF, thereby shutting off communication between the high-pressure side passage 53 and the low-pressure side passage 54 and enabling high-pressure injection using the high-pressure gasoline pump 4. Since this is not directly related to the invention, however, it will not be explained further.

Figure 6:
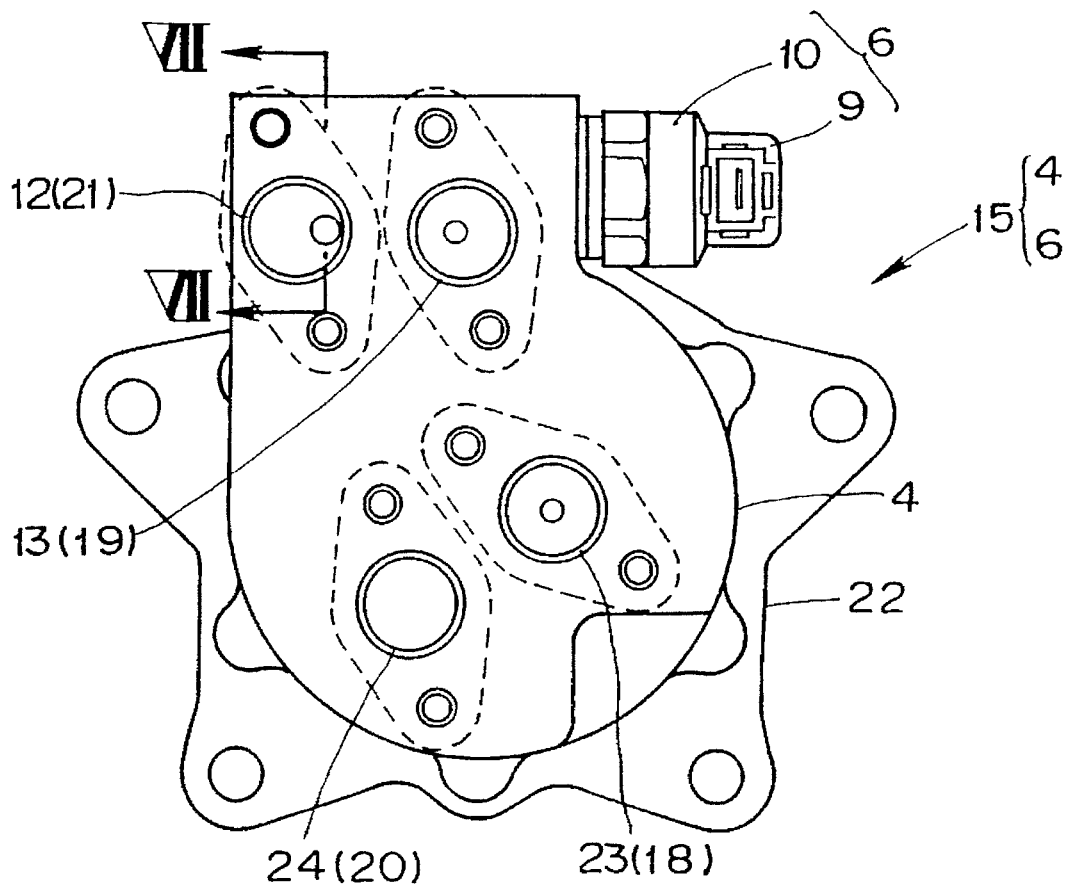
FIG. 6 is a side view of the pump unit 15 in its state as mounted on the cylinder head 17 of the engine 16, shown from the side to which the pipes (a fuel supply pipe 18, a fuel return pipe 19, a high-pressure fuel supply pipe 20 and a high-pressure fuel control pipe 21) are connected.
Figure 7:
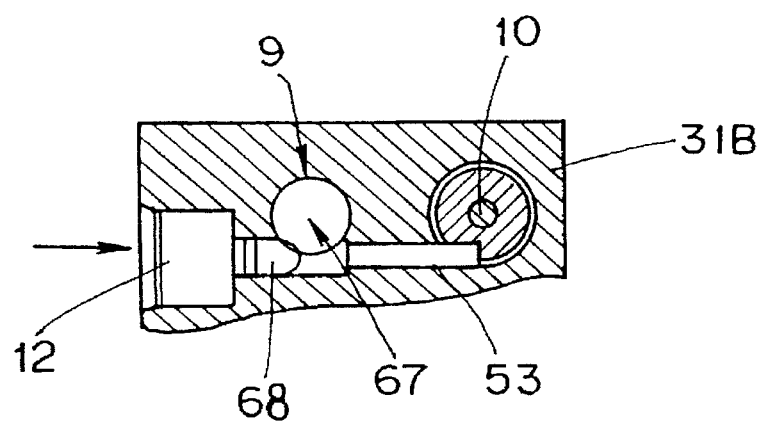
FIG. 7 is a sectional view taken along VII—VII in FIG. 6.

FIG. 6 is a side view of the pump unit 15 in its state as mounted on the cylinder head 17 of the engine 16, shown from the side to which the pipes (the fuel supply pipe 18, fuel return pipe 19, high-pressure fuel supply pipe 20 and high-pressure fuel control pipe 21) are connected. FIG. 7 is a sectional view taken along VII—VII in FIG. 6.

The insulation system between the pump unit 15 (high-pressure gasoline pump 4 and solenoid valve unit 6) and the cylinder head 17 of the engine 16 will now be explained with reference to FIGS. 8 to 10.

Figure 8:
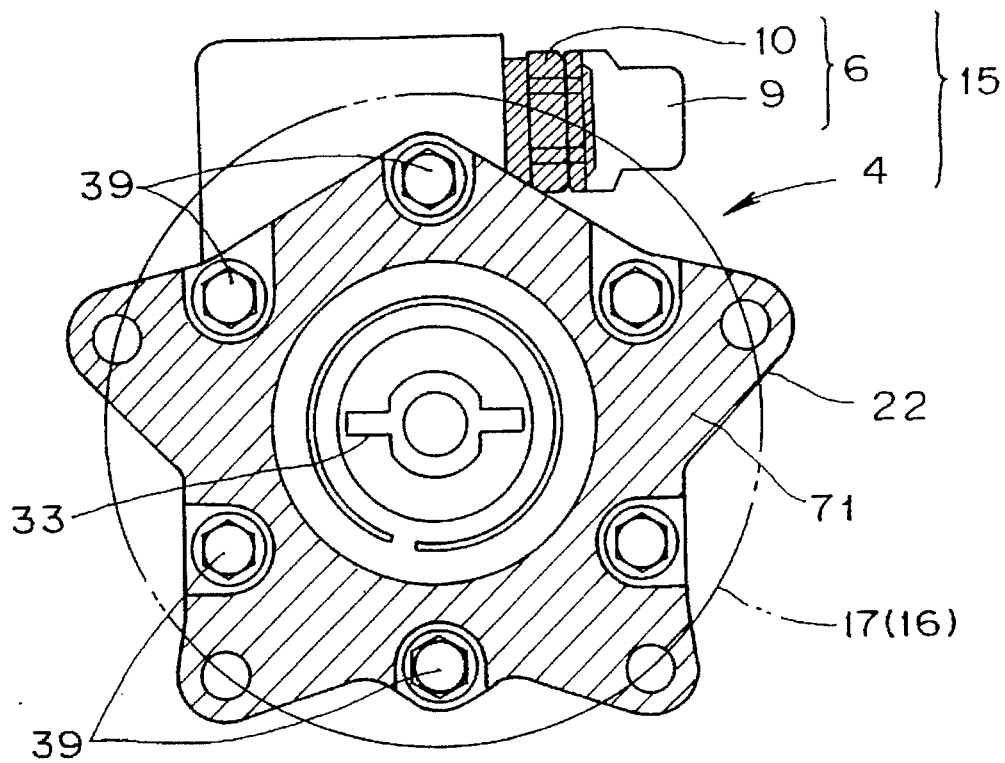
FIG. 8 is a side view of the pump unit 15, shown from the side of a coupling 33 of the high-pressure gasoline pump 4.
Figure 9:
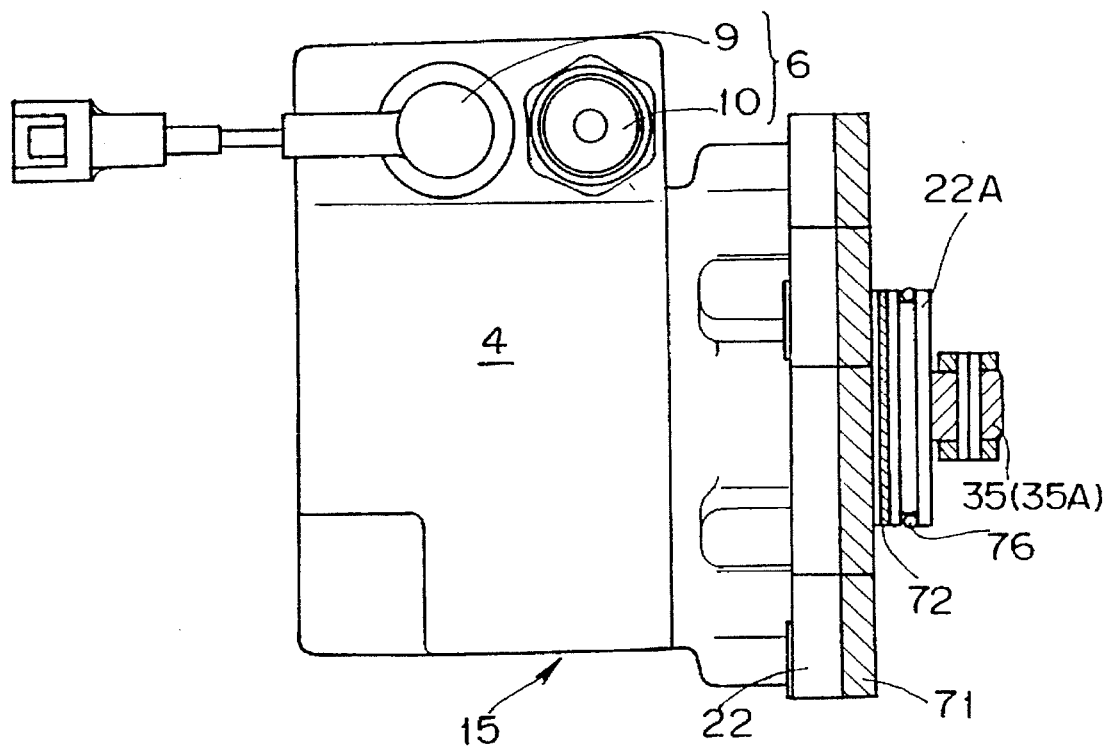
FIG. 9 is a plan view of the pump unit 15, showing the solenoid valve unit 6 from the top.

FIG. 8 is a side view of the pump unit 15, shown from the side of the coupling 33 of the high-pressure gasoline pump 4, and FIG. 9 is a plan view of the pump unit 15, showing the solenoid valve unit 6 from the top. A first heat insulation member (heat insulation sheet) 71 is provided on the flange 22 used for mounting the pump unit 15 on the cylinder head 17.

It is also possible instead to form the whole flange 22 of a heat insulation material.

Figure 10:
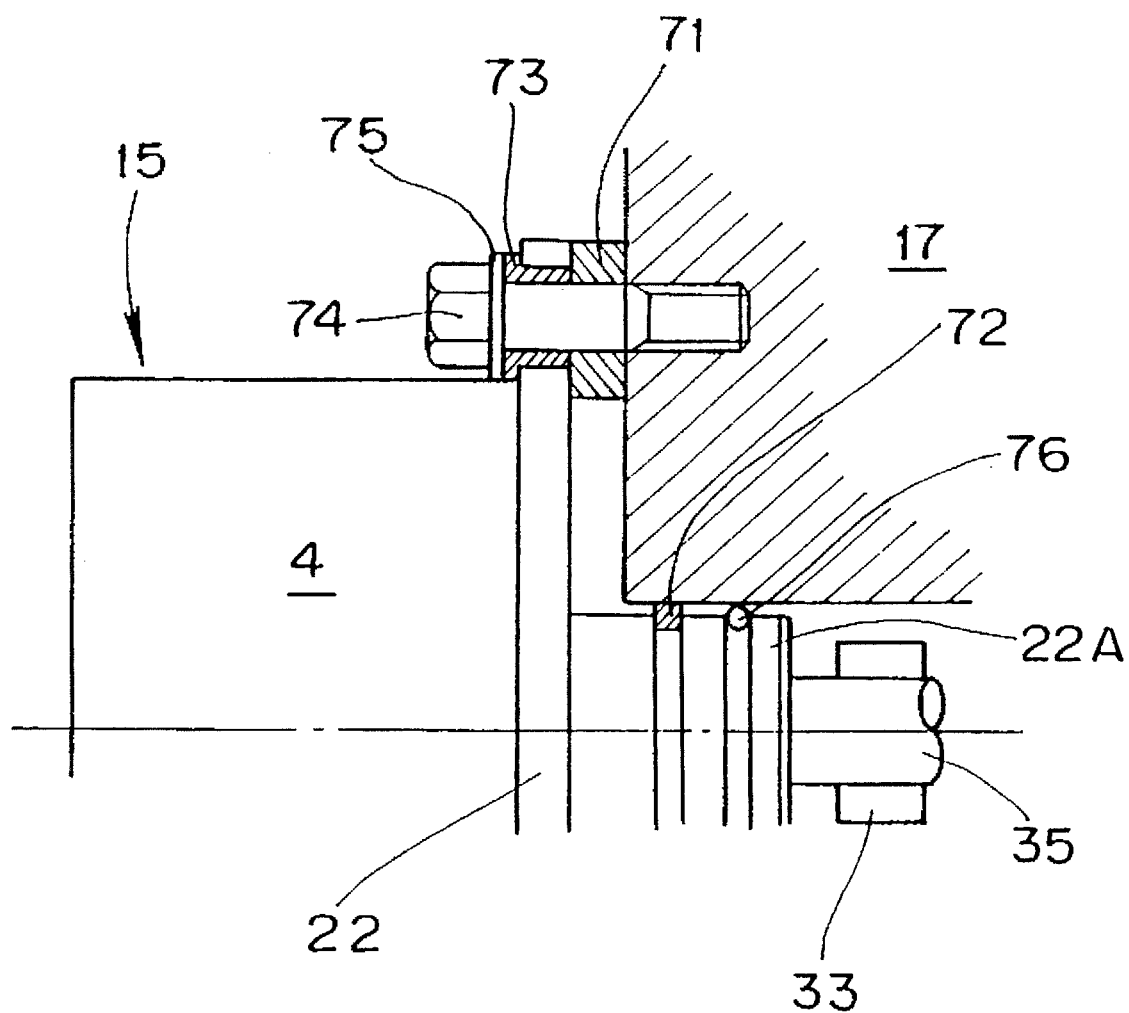
FIG. 10 is an enlarged view of an essential part of the mounting portion between the pump unit 15 and the cylinder head 17.

FIG. 10 is an enlarged view of an essential part of the mounting portion between the pump unit 15 and the cylinder head 17. As shown, a second heat insulation member (heat insulation ring) 72 is provided on a connecting portion 22A of the flange 22.

As also shown, third heat insulation members (heat insulation collars) 73 are further provided between the flange 22 and the cylinder head 17, in addition to the first heat insulation member 71.

The first heat insulation member 71 prevents conduction of heat between the cylinder head 17 and the flange 22.

The second heat insulation member 72 prevents conduction of heat between the cylinder head 17 and the connecting portion 22A.

The third heat insulation members 73 prevent conduction of heat from the cylinder head 17 to the flange 22 through mounting bolts 74 and washers 75.

Reference numeral 76 in FIGS. 9 and 10 designates an O-ring.

In the fuel pump for a high-pressure fuel injection system 1 of the foregoing configuration, once normal engine operation begins following the start of misfire free operation, the pistons 42 are reciprocated by the rotation of the pump shaft 35 of the high-pressure gasoline pump 4, causing fuel to be sucked in and discharged and thus supplying fuel to the injectors 8 through the discharge passage 37 and the common rail 7.

When the pump unit 15 is mounted on the cylinder head 17, the flange 22 can be used in common as the mounting flange for both the high-pressure gasoline pump 4 and the solenoid valve unit 6. As a result, the mounting requires minimal installation space on the engine 16 and the cylinder head 17 and can be achieved with a small number of installation steps.

Moreover, since the only metal pipes that have to be installed are the high-pressure fuel supply pipe 20 and the high-pressure fuel control pipe 21 connected between the pump unit 15 and the common rail 7 and since the arrangement of these pipes between the attachment surface of the pump unit 15 and the attachment surface of the common rail 7 is simple, the metal piping is easy to install, which is particularly advantageous when the engine 16 has limited space for pipe installation.

The invention further enables the piping to be attached by an easy method and reduces the risk of fuel leakage.

Since the high-pressure fuel supply pipe 20 and the high-pressure fuel control pipe 21 can be installed side by side, moreover, an increase in mechanical strength can be obtained.

If the possibility of the engine 16 being stopped by insufficient fuel supply owing to fuel vaporization (vapor lock) can be completely eliminated, a single metal pipe suffices. In this case the number of connection points is halved. It is also possible to incorporate the function of the common rail 7 in the high-pressure gasoline pump 4 and to connect the high-pressure gasoline pump 4 directly with the injectors 8.

Since the insulation system (the first heat insulation member 71, second heat insulation member 72 and third heat insulation members 73) are used in common by the high-pressure gasoline pump 4 and the solenoid valve unit 6, no need arises to attach a separate heat insulation plate at the solenoid valve unit 6 and fuel vaporization can be suppressed by restraining fuel temperature rise due to contact with the engine 16.

This invention does not place any particular restriction on the positional relationship between the high-pressure gasoline pump 4 and the solenoid valve unit 6. Specifically, the solenoid valve unit 6 can be located on the top, bottom or side of the high-pressure gasoline pump 4 and the fuel supply pipe 18, fuel return pipe 19, high-pressure fuel supply pipe 20 and high-pressure fuel control pipe 21 be arranged as appropriate for the particular location.

As explained in the foregoing, the invention integrates the high-pressure pump and the solenoid valve unit of a high-pressure fuel injection system such as a direct-injection type gasoline injection system and, as such, is able to provide a fuel pump that is advantageous in terms of installation space, pipe connection work, insulation system, and seal performance.

What is claimed is:

1. A fuel pump for a high-pressure fuel injection system comprising:

a high-pressure fuel pump for supplying high-pressure fuel to injectors for injecting high-pressure fuel into cylinders of an engine, a pressure control valve for controlling the fuel pressure of the high-pressure fuel pump, the high-pressure fuel pump and the pressure control valve being integrated to constitute a pump unit, the pump unit being adapted for mounting on the engine, the high pressure fuel pump has a cover, a pump housing and a flange, and the pressure control valve has a unit housing, the unit housing of the pressure control valve and the cover of the high-pressure fuel pump being constituted integrally, clustered on a side of the pump unit separate from the flange of the high-pressure fuel pump are a supply pipe connector for connecting a fuel supply pipe from a fuel tank for the fuel, a low-pressure side outlet port for connecting a fuel return pipe passing from the high-pressure control valve to the fuel tank, a high-pressure supply pipe connector for connecting a high-pressure fuel supply pipe passing from the pump unit to the injectors, and a high-pressure side inlet port for connecting a high-pressure fuel control pipe passing from the injectors to the pump unit.

2. A fuel pump for a high-pressure fuel injection system according to claim 1, wherein the flange is adapted for mounting the pump unit on the engine.

3. A fuel pump for a high-pressure fuel injection system according to claim 1, wherein the pump unit is adapted for connection to the injectors by metal fuel pipes.

4. A fuel pump for a high-pressure fuel injection system according to claim 3, wherein the metal fuel pipes are a high-pressure fuel supply pipe passing from the pump unit to the injectors and a high-pressure fuel control pipe passing from the injectors to the pump unit.

5. A fuel pump for a high-pressure fuel injection system comprising:

a high-pressure fuel pump for supplying high-pressure fuel to injectors for injecting high-pressure fuel into cylinders of an engine, a pressure control valve for controlling the fuel pressure of the high-pressure fuel pump, the high-pressure fuel pump and the pressure control valve being integrated to constitute a pump unit, the pump unit being adapted for mounting on the engine, wherein the pump unit is adapted for connection to the injectors by metal fuel pipes, the pressure control valve is a high-pressure control valve having a unit housing, a solenoid valve and a filter are further provided in the unit housing together with the high-pressure control valve, and the solenoid valve is disposed near the side of the unit housing portion to which the fuel pipe is connected, thereby securing a filter installation space for the filter.

6. A fuel pump for a high-pressure fuel injection system comprising:

a high-pressure fuel pump for supplying high-pressure fuel to injectors for injecting high-pressure fuel into cylinders of an engine, a pressure control valve for controlling the fuel pressure of the high-pressure fuel pump, the pressure control valve is a high-pressure control valve having a unit housing, the high-pressure fuel pump and the pressure control valve being integrated to constitute a pump unit and the pump unit being adapted for mounting on the engine, a high-pressure side passage, a low-pressure side passage and a solenoid valve are further provided in the unit housing, the high-pressure control valve and the solenoid valve are disposed across the high-pressure side passage and the low-pressure side passage, and the solenoid valve is adapted to establish and shut off communication between the high-pressure side passage and the low-pressure side passage, this arrangement constituting a solenoid valve unit, and the solenoid valve unit and the high-pressure gasoline pump are integrated to constitute the pump unit.

7. A fuel pump for a high-pressure fuel injection system according to claim 1, wherein the high-pressure gasoline pump is adapted for connection to the injector through a common rail, and the high-pressure control valve is adapted for connection to the common rail.

8. A fuel pump for a high-pressure fuel injection system comprising:

a high-pressure fuel pump for supplying high-pressure fuel to injectors for injecting high-pressure fuel into cylinders of an engine, a pressure control valve for controlling the fuel pressure of the high-pressure fuel pump, the high-pressure fuel pump and the pressure control valve being integrated to constitute a pump unit, the pump unit being adapted for mounting on the engine, wherein the pump unit further comprises a heat insulation system and is adapted for mounting on the engine through the medium of the heat insulation system.

9. A fuel pump for a high-pressure fuel injection system according to claim 8, wherein the high-pressure gasoline pump further comprises a flange adapted for mounting the pump unit on the engine and the heat insulation system comprises at least one of a first heat insulation member provided on the flange and adapted to come between the flange and the engine, a second heat insulation member provided on the flange at a connecting portion thereof adapted for connecting the pump unit to the engine, and a third heat insulation member provided on the flange and adapted to come between the flange and a fastening means for fastening the pump unit to the engine.

10. A fuel pump for a high-pressure fuel injection system according to claim 1, wherein the high-pressure gasoline pump is a radial piston pump comprising a pump shaft adapted for rotation by the engine and pistons reciprocated by rotation of the pump shaft.

* * * * *